Patented Aug. 2, 1932

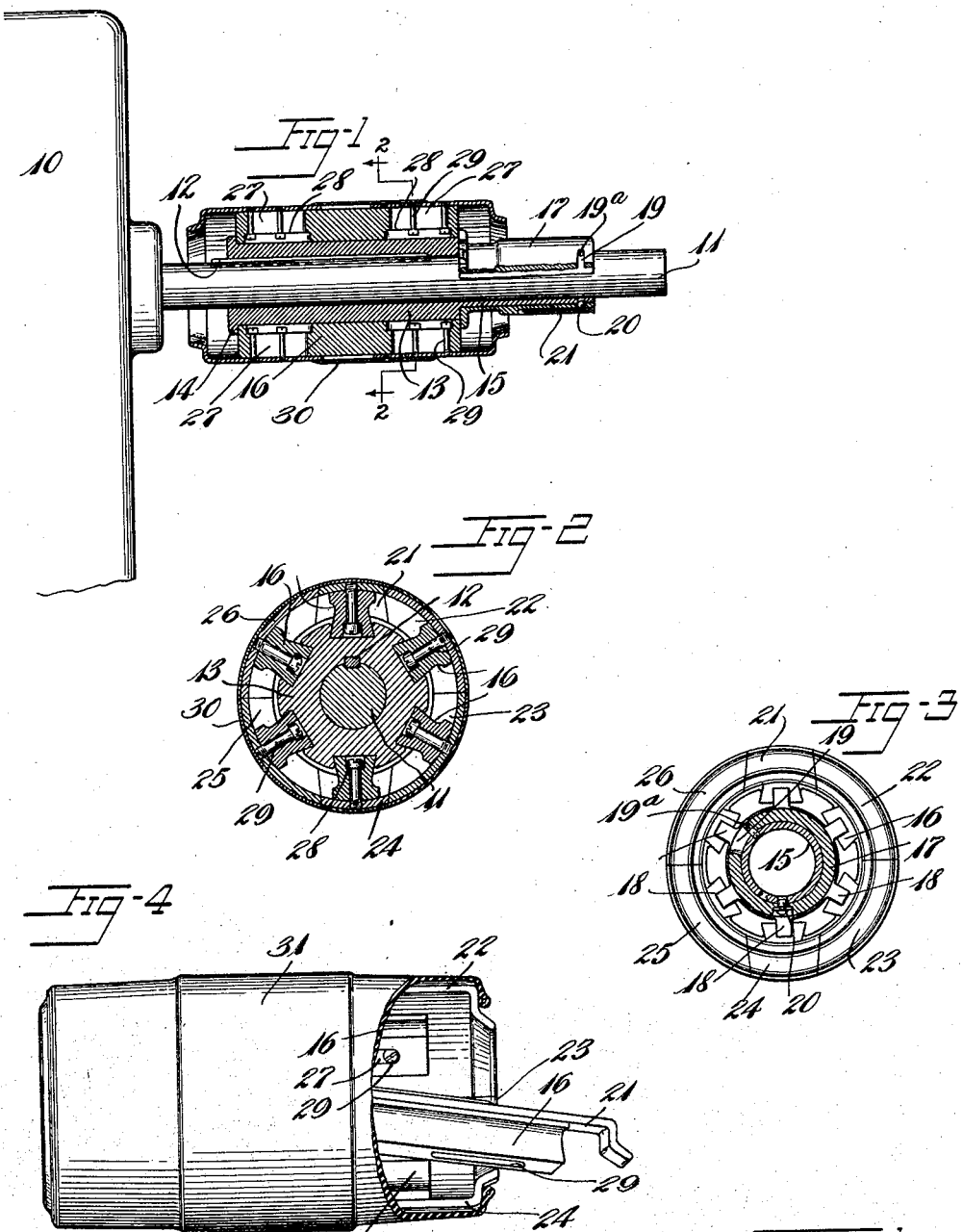

1,869,656

UNITED STATES PATENT OFFICE

JOSEPH J. BLACK, OF AKRON, OHIO, ASSIGNOR TO THE B. F. GOODRICH COMPANY, OF NEW YORK, N. Y., A CORPORATION OF NEW YORK

TIRE BUILDING APPARATUS

Application filed February 20, 1931. Serial No. 517,170.

My invention relates to tire-building apparatus for use in the manufacture of tires by the flat band method and more particularly to apparatus for use in the manufacture of tires having a small bead diameter.

In the manufacture of such tires the tire building material is assembled by winding plies of rubberized cords about a mandrel or drum, incorporating in the margins of the article non-extensible bead-cores and thereafter applying the rubber tread portion of the tire. During the building operation the tire is revolved at a high velocity while various devices are used to form or spin the material. It is then necessary to remove the article from the mandrel and expand its central portion to proper shape and diameter. Where the bead diameter is small very little space is provided for the removal of the mandrel from the tire due to the proximity of the bead-cores to the drive shaft of the tire building machine upon which it is supported. This difficulty is increased because of the fact that the portion lying between the bead cores is usually built to a greater diameter than the diameter of the bead-cores themselves. The width of such a tire as built on the drum or shell may be greater than its bead diameter.

Objects of my invention are to provide a rigid structure on which the tires may be accurately built; which may be easily removed from the tire when desired without deforming the tire; and on which tires of different sizes, having equal bead diameters, may be built.

Other objects are to provide economy in tire manufacture, simplicity of apparatus, and interchangeability of parts thereof.

Other objects will appear from the accompanying description and drawing illustrating my invention.

Of the accompanying drawing:

Fig. 1 is an elevation of part of a tire-building machine, showing the device of my invention in place on the spindle of the machine, the device being shown in section.

Fig. 2 is a cross-section on line 2—2 of Fig. 1.

Fig. 3 is an end elevation of the device partly in section, and

Fig. 4 is a side elevation of the device with a completed tire thereon, parts of the tire being broken away to show the removal of the shell sections.

Referring to the drawing, the numeral 10 designates conventionally a tire building machine drive from which projects the former-supporting and driving spindle 11, which is designed to be rotated by the drive in any desired manner. The shaft 11 is provided with a feather-key 12 for driving the former. Mounted on the shaft 11, is a sleeve 13, provided at the end toward the drive 10 with an enlarged shoulder 14, and at the opposite end with a reduced elongate neck 15. The sleeve 13 is provided with a key-way by which it engages the key 12. Its outer surface is splined or formed to provide a plurality of equally spaced dovetailed slots extending longitudinally from the shoulder 14 to the neck 15. Slideably mounted in the dovetail slots, so as to prevent radial movement under the influence of centrifugal forces, are a plurality of dovetail bars 16. These bars, which are similar in construction, support the complementary shell sections which form the work face of the device and are secured thereto. A sleeve 17 is loosely mounted on the sleeve 15. At the end which abuts the sleeve 13, it is provided with a plurality of radially extending fingers 18, corresponding in number to bars 16, and equally spaced. Sleeve 17 is provided with a circumferential slot 19 in which is confined a pin 19a projecting from sleeve 15, the slot being of sufficient length to allow sleeve 17 to rotate on sleeve 15 through an arc equal to half the arc between the centers of two adjacent bars 16. A locking pin 20 carried by a flat spring 21 anchored to sleeve 17 normally extends through a dowel hole provided therefor in sleeve 17 and enters a depression in sleeve 15 located at such a position as to cause fingers 18 to lock bars 16 in their corresponding slots as shown in Fig. 3. By lifting the end of spring 21 the pin 20 will be withdrawn from sleeve 15 and sleeve 17 may be rotated to such a position that fingers 18 lie between the dovetail slots in sleeve 13, whereupon bars 16 may be individually or collectively removed longitudinally of shaft 11.

The operating face of the device consists generally of a cylindrical shell provided with reduced shoulder portions at its margins. In order to provide for removing the shell from the tire it is divided longitudinally to form a number of complementary sections 21, 22, 23, 24, 25 and 26 (see Fig. 3). Some of the lines of division are radial, whereas others are non-radial, thereby defining key sections such as 21 and 24. In order to provide for the building of different widths of tires on the same device, I further divide each of the sections 21, 22, 23, 24, 25, and 26 near the center and mount them adjustably on the bars 16. To this end, the bars 16 are provided with longitudinal slots 27 having shoulders 28 for engaging screws 29 which hold the shell sections in place. One of the two shell sections mounted on each bar 16 is provided with a bridging extension 30 fastened thereto, as by rivets, and adapted to bridge the gap between the pair of sections at any relative position of the sections allowed by the slots 27.

The operation of the device is as follows: The sleeve 13 normally remains fixed on the spindle 11. The shell sections are adjusted on the bars 16 to the width of tire which it is desired to build, and are fastened in place thereon by screws 29. The bars 16 carrying the shell sections are now slid into position in the dovetail slots and the sleeve 17 is turned on sleeve 15 until pin 20 drops into the locking recess. The bars 16 are now fixed against displacement and the shell sections present a cylindrical working surface on which the tire 31 is built. After a tire is built, the operator lifts spring 21 to dislocate pin 20 and rotates the sleeve 17 on the sleeve 15 to such a position that fingers 18 uncover the ends of bars 16. The operator then slides bars 16, collectively from sleeve 13 by grasping the tire 31 and moving it to the right in Fig. 1. The bars 16 carrying shell sections 21 and 24 may now be pushed toward the center and removed endwise from the tire. The other sections may thereafter also be removed endwise. The bars 16 are now returned one at a time to their dovetailed slots on sleeve 13, and the device is ready for another tire to be built.

The dovetailed engagement of the bars 16 in the splined sleeve 13, prevents radial movement of the shell sections under the influence of the centrifugal force incident to the performing of rolling and spinning operations on the tire. In fact such forces more firmly wedge the bars 16 in their respective slots and by increasing the force of their engagement with said slots, prevent accidental longitudinal displacement therein.

What I claim is:

1. Tire-building apparatus comprising an externally splined sleeve adapted to be engaged and driven by the spindle of a tire-building machine, a plurality of complementary shell sections slideably engaged in said sleeve, and locking means for confining said sections against longitudinal displacement.

2. Tire-building apparatus comprising an externally splined sleeve fixed to a rotatable spindle, a plurality of complementary shell sections slideably engaged in said sleeve, and locking means for retaining said sections thereto, said sections being collectively removable from the sleeve with the tire and successively removable therefrom without distortion thereof.

3. Apparatus as defined by claim 2 in which the locking means comprises a single means for collectively locking all the sections against longitudinal movement.

4. Apparatus as defined by claim 2 in which the complementary shell sections include means for laterally adjusting their lengths to accommodate tires of different widths.

5. Tire-building apparatus comprising a sleeve member fixed to a rotatable spindle, a plurality of spaced longitudinal splines formed on the outer surface of said member and having outwardly diverging sides which define dovetailed slots in said sleeve, and a plurality of complementary shell sections defining a work engaging surface and so engaged by said diverging sides as to resist radially and axially directed forces when revolved by said spindle.

6. Tire-building apparatus comprising a rotatable shaft, a collapsible tire-building form comprising segmental sections, and interlocking means on the shaft and on the sections, relatively slideable in a direction lengthwise of the shaft, for detachably holding the form on the shaft.

In witness whereof I have hereunto set my hand this 9th day of February, 1931.

JOSEPH J. BLACK.